(12) United States Patent
Menichelli et al.

(10) Patent No.: US 12,399,765 B2
(45) Date of Patent: Aug. 26, 2025

(54) METHOD FOR GENERATING AN FTA FAULT TREE FROM AN FMEA TABLE OF A TECHNICAL SYSTEM OR VICE VERSA

(71) Applicant: ION BEAM APPLICATIONS, Louvain-la-neuve (BE)

(72) Inventors: David Menichelli, Louvain-la-neuve (BE); Andreas Lämmerzahl, Louvain-la-neuve (BE)

(73) Assignee: Ion Beam Applications, Louvain-la-neuve (BE)

( * ) Notice: Subject to any disclaimer, the term of this patent is extended or adjusted under 35 U.S.C. 154(b) by 179 days.

(21) Appl. No.: 18/160,372

(22) Filed: Jan. 27, 2023

(65) Prior Publication Data

US 2023/0244563 A1 Aug. 3, 2023

(30) Foreign Application Priority Data

Jan. 28, 2022 (EP) .................................... 22153965

(51) Int. Cl.
*G06F 11/00* (2006.01)
*G06F 11/07* (2006.01)
*G06F 11/32* (2006.01)

(52) U.S. Cl.
CPC ........ *G06F 11/079* (2013.01); *G06F 11/0793* (2013.01); *G06F 11/327* (2013.01)

(58) Field of Classification Search
CPC ............... G06F 11/079; G06F 11/0793; G06F 11/327

USPC ........................................................ 714/1–57
See application file for complete search history.

(56) References Cited

U.S. PATENT DOCUMENTS

| | | | |
|---|---|---|---|
| 2015/0033080 A1* | 1/2015 | Lee ..................... | G06F 11/0766 714/39 |
| 2018/0018209 A1* | 1/2018 | Höfig ..................... | G06F 11/079 |
| 2021/0406105 A1* | 12/2021 | Kymal ................. | G06Q 10/063 |

FOREIGN PATENT DOCUMENTS

WO 2006/077 590 A2 7/2006

OTHER PUBLICATIONS

European Search Report dated Jul. 7, 2022, EP22153965.3.

* cited by examiner

*Primary Examiner* — Sarai E Butler
(74) *Attorney, Agent, or Firm* — Finnegan, Henderson, Farabow, Garrett & Dunner, LLP

(57) ABSTRACT

A computer-based method for generating one or more FTA fault trees from an FMEA table of a technical system or vice versa. The method includes defining a common data set for both the FMEA table and the one or more FTA fault tree(s) of the technical system, obtaining data of the common data set for the technical system, selecting a representation of the technical system as a FMEA table or as one or more FTA fault tree(s), and using the data of the common data for generating and displaying on a graphical user interface the FMEA table of the technical system or one or more FTA fault tree(s) of the technical system, depending on the selected representation.

15 Claims, 11 Drawing Sheets

Fig. 2

| Step | Substep | Cause | Prev | FM | Barrier | Effect |
|---|---|---|---|---|---|---|
| Step(1) | | Cause(1,0) | Prev(1,0,0) | FM(1) | Barrier(1,0) | EFFECT1 |
| Step(2) | Substep(2,1) | Cause(2,0) | Prev(2,0,0) | FM(2) | Barrier(2,0) | EFFECT2 |
| | | Cause(3,0) | Prev(3,0,0) | FM(3) | Barrier(3,0) | EFFECT1 |
| | | | Prev(3,0,1) | | Barrier(3,1) | |
| | | Cause(4,0) | Prev(4,0,0) | FM(4) | Barrier(4,0) | EFFECT3 |
| | Substep(2,2) | Cause(4,1) | Prev(4,1,1) | | | |
| | | Cause(5,0) | Prev(5,0,0) | FM(5) | Barrier(5,0) | EFFECT2 |
| | | | | | Barrier(5,1) | |
| | | | | | Barrier(5,2) | |
| Step(3) | | Cause(6,0) | Prev(6,0,0) | FM(6) | Barrier(6,0) | EFFECT1 |
| | | | Prev(6,0,1) | | Barrier(6,1) | |
| | | | Prev(6,0,2) | | Barrier(6,2) | |
| | | Cause(6,1) | Prev(6,1,1) | | Barrier(6,3) | |

Fig. 3

| Step | Substep | Cause | Prev | FM | Barrier | EFFECT | S | O | D | RPN | $n_{eff}$ |
|---|---|---|---|---|---|---|---|---|---|---|---|
| Step(1) | | Cause(1,0) | Prev(1,0,0) A | FM(1) | Barrier(1,0) A | EFFECT1 | S(1) | O(1) | D(1) | RPN(1) | $n_{eff}(1)$ |
| Step(2) | | Cause(2,0) | Prev(2,0,0) A | FM(2) | Barrier(2,0) A | EFFECT2 | S(2) | O(2) | D(2) | RPN(2) | $n_{eff}(2)$ |
| | Substep(2,1) | Cause(3,0) | Prev(3,0,0) A | FM(3) | Barrier(3,0) A | EFFECT1 | S(3) | O(3) | D(3) | RPN(3) | $n_{eff}(3)$ |
| | | | Prev(3,0,1) A | | Barrier(3,1) P | | | | | | |
| | | Cause(4,0) | Prev(4,0,0) A | FM(4) | Barrier(4,0) A | EFFECT3 | S(4) | O(4) | D(4) | RPN(4) | $n_{eff}(4)$ |
| | | Cause(4,1) | Prev(4,1,1) P | | | | | | | | |
| | Substep(2,2) | Cause(5,0) | Prev(5,0,0) A | FM(5) | Barrier(5,0) A | EFFECT2 | S(5) | O(5) | D(5) | RPN(5) | $n_{eff}(5)$ |
| | | | | | Barrier(5,1) A | | | | | | |
| | | | | | Barrier(5,2) NA | | | | | | |
| Step(3) | | Cause(6,0) | Prev(6,0,0) A | FM(6) | Barrier(6,0) A | EFFECT1 | S(6) | O(6) | D(6) | RPN(6) | $n_{eff}(6)$ |
| | | | Prev(6,0,1) NA | | Barrier(6,1) NA | | | | | | |
| | | | Prev(6,0,2) P | | Barrier(6,2) A | | | | | | |
| | | Cause(6,1) | Prev(6,1,1) P | | Barrier(6,3) P | | | | | | |

Fig. 8

| Context | | | Mitigation | | | | Cost/benefit analysis | | | |
|---|---|---|---|---|---|---|---|---|---|---|
| Step/substep | Acting on | Against | Name | Type | Status | Strength | Benefit (1/y) | NRE (€) | RE (1/y) | Expenditure over 5y |
| Step(2) | FM(3) | EFFECT1 | Barrier(3,1) | Barrier | P | $p_{miss}(3,1)$ | Benefit(3,1) | NRE(3,1) | RE(3,1) | E(3,1) |
| Substep(2,1) | Cause(4,1,1) | EFFECT3 | Prev(4,1,1) | Prevention | P | $p_{res}(4,1,1)$ | Benefit(4,1,1) | NRE(4,1,1) | RE(4,1,1) | E(4,1,1) |
| Step(3) | Cause(6,0,2) | EFFECT1 | Prev(6,0,2) | Prevention | P | $p_{res}(6,0,2)$ | Benefit(6,0,2) | NRE(6,0,2) | RE(6,0,2) | E(6,0,2) |
| Step(3) | Cause(6,1,1) | EFFECT1 | Prev(6,1,1) | Prevention | P | $p_{res}(6,1,1)$ | Benefit(6,1,1) | NRE(6,1,1) | RE(6,1,1) | E(6,1,1) |
| Step(3) | FM(6) | EFFECT1 | Barrier(6,3) | Barrier | P | $p_{miss}(6,3)$ | Benefit(6,3) | NRE(6,3) | RE(6,3) | E(6,3) |

Fig. 10

| Step/substep | Context | | | Mitigation | | | | Cost/benefit analysis | | | |
|---|---|---|---|---|---|---|---|---|---|---|---|
| | Acting on | Against | Name | Type | Status | Strength | Benefit(1/y) | NRE(€) | RE (1/y) | Expenditure over 5y |
| Step(2) | FM(3) | EFFECT1 | Barrier(3,1) | Barrier | P | $p_{miss}(3,1)$ | Benefit(3,1) | NRE(3,1) | RE(3,1) | E(3,1) |
| Substep(2,1) | Cause(4,1,1) | EFFECT3 | Prev(4,1,1)* | Prevention | P | $p_{rev}(4,1,1)$ | Benefit(4,1,1)* | NRE(4,1,1)* | RE(4,1,1)* | E(4,1,1)* |
| Step(3) | Cause(6,0,2) | EFFECT1 | Prev(6,1,1) | Prevention | P | $p_{rev}(6,0,2)$ | | | | |
| Step(3) | Cause(6,1,1) | EFFECT1 | Prev(6,1,1) | Prevention | P | $p_{rev}(6,1,1)$ | Benefit(6,1,1) | NRE(6,1,1) | RE(6,1,1) | E(6,1,1) |
| Step(3) | FM(6) | EFFECT1 | Barrier(6,3) | Barrier | P | $p_{miss}(6,3)$ | Benefit(6,3) | NRE(6,3) | RE(6,3) | E(6,3) |

Fig. 11

METHOD FOR GENERATING AN FTA FAULT TREE FROM AN FMEA TABLE OF A TECHNICAL SYSTEM OR VICE VERSA

CROSS REFERENCE TO RELATED APPLICATIONS

This application claims priority of European patent application no. 22153965.3 filed on Jan. 28, 2022, which is incorporated herein by reference in its entirety.

TECHNICAL FIELD

The present disclosure relates to the field of risk analysis of technical systems, and more particularly of technical systems which are used in the field of healthcare such as radiation therapy.

The present disclosure also relates to an apparatus for generating one or more FTA fault trees from an FMEA table of a technical system or vice versa, and to a computer program product storing executable instructions.

BACKGROUND

Risk analysis is well known in several industries and a number of methods and computer-based tools have been developed to assist a user in performing such analysis. Currently, two proactive risk assessment methods and related computer-assisted tools are most frequently used, namely Failure Modes and Effects Analysis (hereafter "FMEA") and Fault Tree Analysis (hereafter ("FTA), and their variants.

Each of these two methods has its own particulars, advantages, and drawbacks. FMEA is often used because it is intuitive and easy to implement with common software tools, such as a spreadsheet for example, but it is a time consuming and hence relatively inefficient method. FTA on the other hand has the capability to represent logical connections between causes and effects, but it is neither intuitive nor simple to carry out and it requires specialized software tools which are not always suited to the specific industry or technical system to be analyzed.

Because of their respective advantages, it is nevertheless desirable—and in some cases even recommended by standards—to use both FMEA and FTA to perform a risk analysis of a given technical system. In current practice, FMEA and FTA are, however, built and maintained separately, and they are usually established during different phases of a system development process for different purposes, which is both time consuming and prone to errors and inconsistencies. This is of particular concern for safety-critical applications, such as when proactively assessing the risk related to the use of medical devices.

European patents EP 1192543B1 and EP3270249B1 disclose methods for generating a fault tree for a technical system, starting from data which have been determined using an FMEA of the system and by adding information about functional relationships between system elements. The reverse operation, namely the generation of an FMEA table starting from data which have been determined using a fault tree is however not possible or at least not disclosed in an enabling manner.

US patent U.S. Pat. No. 9,430,311B2 (Lee) discloses how to perform an FMEA of portions of a fault tree of an FTA. Initiating events and top events of the portion of fault tree are considered respectively as causes and effects in the FMEA analysis. The reverse operation, namely the generation of a fault tree starting from data which have been determined using an FMEA is however not possible or at least not disclosed in an enabling manner.

Albeit complementary, these two known risk assessment methods and their respective data structures are not compatible. In particular, these data structures cannot be combined in a such a way that a user can seamlessly switch from an FMEA to an FTA model or vice versa and therefore ensure compatibility and coherence between both kinds of analysis of a given technical system.

SUMMARY

The present disclosure provides a computer-based method which allows a user to perform a proactive risk analysis of a given technical system, either in an FMEA representation or in an FTA representation of said given technical system and to switch at any time and as desired between the two representations without requiring the input of any additional data.

In accordance with the present disclosure, there is provided a computer-based method for generating one or more FTA fault tree(s) from an FMEA table of a technical system or vice versa, the method comprising the steps of:
a) defining a common data set for both the FMEA table and the one or more FTA fault tree(s) of the technical system, wherein the common data set comprises:
at least one set of failure modes;
a set of causes associated to each failure mode of said set of failure modes;
a set of effects associated to each failure mode of said set of failure modes;
a set of risk mitigation measures associated to each failure mode of said set of failure modes and wherein each risk mitigation measure is classified either as a prevention if it is able to block a cause before said cause activates an associated failure mode or as a barrier if it is able to detect a failure mode before said failure mode generates an associated effect; and
a set of process steps as implemented by the technical system when in operation, wherein to each process step of said set of process steps is associated a set of failure modes of said at least one set of failure modes;
b) obtaining data of the common data set for the technical system;
c) selecting a representation of the technical system as a FMEA table or as one or more FTA fault tree(s); and
c1) if a representation of the technical system as a FMEA table is selected, generating and displaying on a graphical user interface the FMEA table of the technical system by using the data of the common data set and by grouping the failure modes in said table according to the process step they correspond to,
c2) if a representation of the technical system as one or more FTA fault tree(s) is selected, generating and displaying on the graphical user interface the one or more FTA fault tree(s) of the technical system by using the data of the common data set, wherein each FTA fault tree has one effect of said set of effects as a top event and is configured to represent the following relationships between the causes, the failure modes, the effects, the preventions and the barriers:
an effect is produced if an associated failure mode generates it;

a failure mode generates its associated effects if the failure mode occurs, and all the barriers associated to the failure mode fail to detect the failure mode; and a failure mode occurs if any of its associated causes activates it, and all the associated preventions fail to prevent the associated cause from activating the failure mode.

With such a method, the FMEA table and the FTA fault tree(s) of a given technical system become indeed equivalent and simply constitute two different representations of the same risk-related data. Hence, a user may equally work in the FMEA or in the FTA representation of the technical system under study and effortlessly switch from FMEA to FTA or vice-versa, at any time and as desired, without requiring the input of any additional data from the user.

Due to this equivalence and use of a common data set, the data which are added, deleted, or modified in one representation will automatically be reflected into the other. Coherence and integrity between both representations can therefore be ensured.

In some embodiments, in each FTA fault tree corresponding to a given EFFECT, the failure modes are displayed as branches and casted in the form:

EFFECT=OR (effect(1), . . . , effect(I));
effect(i)=AND (failure mode(i), barrier(i,0), . . . , barrier (i,J));
failure mode(i)=OR (failure mode(i,1), . . . , failure mode(i,K));
failure mode(i,k)=AND (cause(i,k), prevention(i,k, 1), . . . , prevention(i,k,N));
wherein:
effect(i)=the EFFECT is generated by the ith failure mode, (i=1 . . . I),
failure mode(i)=the ith failure mode associated to the effect(i), (i=1 . . . I) occurs,
barrier(i,j)=the jth barrier fails to detect the occurrence of ith failure mode before it generates the effect(i), (j=0 . . . J),
failure mode(i,k)=the ith failure mode occurs due to the kth cause, (k=0 . . . K),
cause(i,k)=the kth cause associated to the ith failure mode activates it,
prevention(i,k,n)=the nth prevention fails to block cause (i,k) from activating the failure mode(i), (n=0 . . . N).

This embodiment is advantageous as it uses a particular representation of the FTA fault tree involving a simplified and concise visualization of the various events, gates, and their respective connections, which in turn renders the risk analysis based on it easier and more valuable.

In some embodiments, a prevention is classified as an initial prevention or as an added prevention in case it is chronologically posterior to the initial prevention, and/or a barrier is classified as an initial barrier or as an added barrier in case it is chronologically posterior to the initial barrier.

This embodiment is beneficial as it allows the user to update the data of the common data set as more information about the technical system under study become available. This leads to a more accurate and more efficient risk analysis of the technical system under study.

In some embodiments, the step of obtaining data of the common data set is performed by requesting a user to input the data of the common data set, in particular via the graphical user interface.

In some embodiments, the step of selecting a representation of the technical system as a FMEA table or as one or more FTA fault tree(s) is performed by requesting a user to select a representation of the technical system as an FMEA table or as one or more FTA fault tree(s). This specific execution allows the user the flexibility to operate according to his/her preferences and to select the type of representation which better fits with the technical system under study.

In some embodiments, the method further comprises the step of calculating a risk assessment metric associated to a failure mode, the risk assessment metric comprising:

a) a probability that said failure mode is activated by the associated causes; and/or
b) a measure of the strength of the risk mitigation measures associated to said failure mode; and/or
c) a probability that said failure mode generates its associated effects.

According to this embodiment, the end-user has the possibility to add risk assessment metrics to the overall risk analysis and therefore to perform a statistical analysis of the risks. The use of such additional metric not only beneficially impacts the overall efficiency of the associated risk analysis by focusing on the most impactful failure modes, but also allows achieving increased objectivity of the risk analysis by using more measurable parameters.

In some embodiments, the risk assessment metric for use herein includes occurrence (O) and/or detectability (D) and/or severity (S) of said failure mode. This allows converting relatively subjective parameters into probabilities which are not only more quantifiable but also more benchmarkable. And this, ultimately leads to a more objective risk analysis.

The present disclosure also provides an apparatus for generating one or more FTA fault trees from an FMEA table of a technical system or vice versa, the apparatus comprising one or more modules configured to perform the method as described herein.

The present disclosure further provides a computer program product storing executable instructions, which when executed by a computer, cause the computer to perform the method as described herein.

BRIEF DESCRIPTION OF THE FIGURES

These and further aspects will be explained in greater detail by way of examples and with reference to the accompanying drawings in which:

FIG. 2 shows an exemplary graphical user interface depicting one exemplary way of performing the step of obtaining data of the common data set for the technical system.

FIG. 3 shows an exemplary FNMA table of an exemplary technical system.

FIG. 8 shows another exemplary FMEA table of the exemplary technical system used for generating the FMEA table of FIG. 3.

FIG. 10 shows an exemplary cost benefit analysis table of exemplary risk mitigation measures for use in one exemplary embodiment of the method according to the present disclosure.

FIG. 11 shows another exemplary cost benefit analysis table of other exemplary risk mitigation measures for use in another exemplary embodiment of the method according to the present disclosure.

The drawings of the figures are neither drawn to scale nor proportioned. Generally, similar or identical components are denoted by the same reference numerals in the figures.

DETAILED DESCRIPTION

Figure 1:
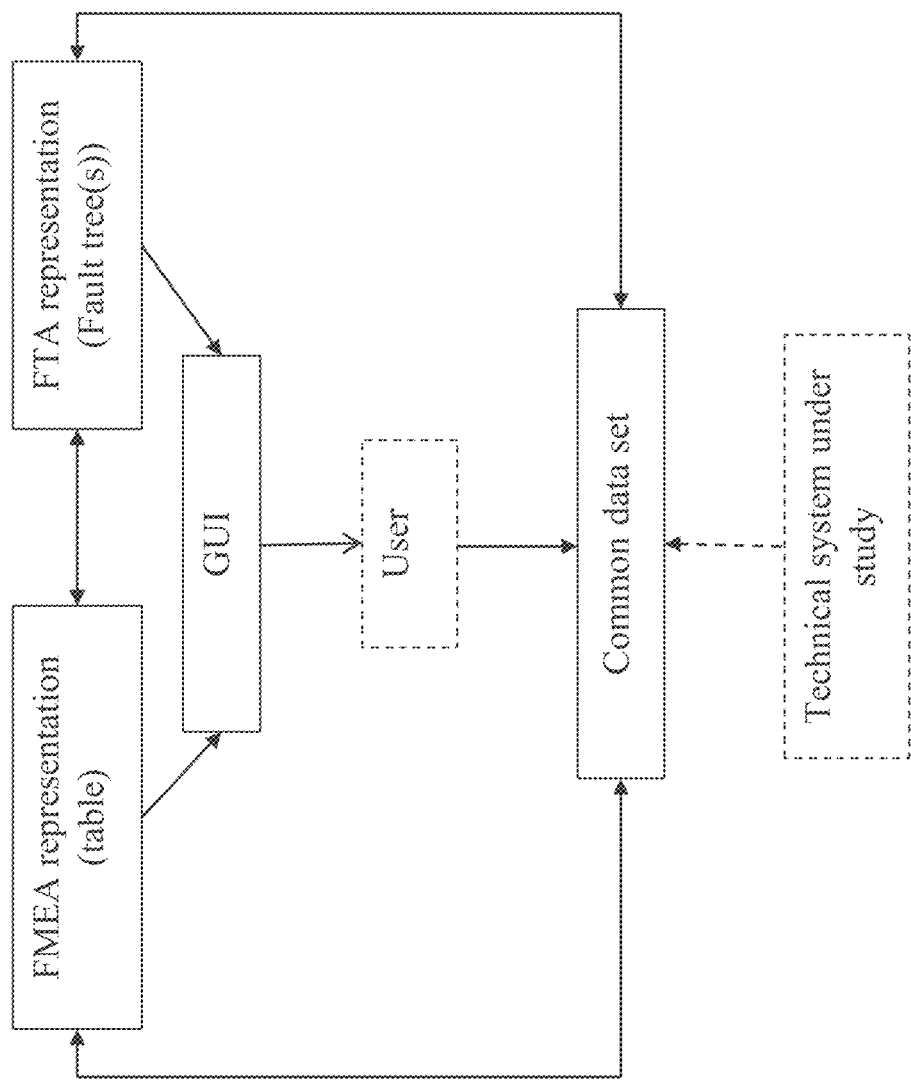
FIG. 1 shows a flow diagram depicting an exemplary embodiment of the method according to the present disclosure.

According to a first aspect, there is provided a computer-based method for generating one or more FTA fault trees from an FMEA table of a technical system or vice versa, the method comprising the steps of:
a) defining a common data set for both the FMEA table and the one or more FTA fault tree(s) of the technical system, wherein the common data set comprises:
  at least one set of failure modes;
  a set of causes associated to each failure mode of said set of failure modes;
  a set of effects associated to each failure mode of said set of failure modes;
  a set of risk mitigation measures associated to each failure mode of said set of failure modes and wherein each risk mitigation measure is classified either as a prevention if it is able to block a cause before said cause activates an associated failure mode or as a barrier if it is able to detect a failure mode before said failure mode generates an associated effect; and
  a set of process steps as implemented by the technical system when in operation, wherein to each process step of said set of process steps is associated a set of failure modes of said at least one set of failure modes;
b) obtaining data of the common data set for the technical system;
c) selecting a representation of the technical system as a FMEA table or as one or more FTA fault tree(s); and
  c1) if a representation of the technical system as a FMEA table is selected, generating and displaying on a graphical user interface the FNMA table of the technical system by using the data of the common data set and by grouping the failure modes in said table according to the process step they correspond to,
  c2) if a representation of the technical system as one or more FTA fault tree(s) is selected, generating and displaying on the graphical user interface the one or more FTA fault tree(s) of the technical system by using the data of the common data set, wherein each FTA fault tree has one effect of said set of effects as a top event and is configured to represent the following relationships between the causes, the failure modes, the effects, the preventions and the barriers:
  an effect is produced if an associated failure mode generates it;
  a failure mode generates its associated effects if the failure mode occurs, and all the barriers associated to the failure mode fail to detect the failure mode; and
  a failure mode occurs if any of its associated causes activates it, and all the associated preventions fail to prevent the associated cause from activating the failure mode.

As used herein, the terms "computer-based", "generating", "determining" or "configuring" are meant to refer to the action and/or processes of a computer that processes and/or transforms data into other data. The term "computer" is meant to designate any electronic device with data processing capabilities. The term "module" is meant to refer to a processor and/or a memory unit storing computer readable instructions.

The term "technical system" is meant to designate any technical system with a plurality of technical components possibly interacting with each other. Exemplary technical systems for use herein include, but are not limited to, healthcare technical systems or power plants. Preferably, the technical system for use herein is a healthcare technical system, in particular for clinical use such as for example a particle therapy system.

Reference will now be made in detail to some particular embodiments, examples of which are illustrated in the accompanying figures. The accompanying figures are intended to provide a better understanding of the embodiments. They show schematics of embodiments and serve in conjunction with the description to explain principles and concepts of the disclosed subject matter.

FIG. 1 shows a graphical representation of the underlying principle and components of the method according to the present disclosure, as well as how those components interact with each other.

As detailed above, the method for generating one or more FTA fault trees from an FMEA table of a technical system or vice versa comprises the step of defining a common data set for both the FMEA table and the one or more FTA fault tree(s) of the technical system. The common data set comprises: 1) at least one set of failure modes; 2) a set of causes associated to each failure mode of said set of failure modes; 3) a set of effects associated to each failure mode of said set of failure modes; 4) a set of risk mitigation measures associated to each failure mode of said set of failure modes; and 5) a set of process steps as implemented by the technical system when in operation.

The method further comprises the step of obtaining data of the common data set for the technical system. The data of the common data set are typically inputted by the user, generally via a graphical user interface (GUI) according to techniques well known to those skilled in the art. The data of the common data set are typically stored in a database which may be a local database on a user's computer, a database on a remote server or in the Cloud for example.

Figure 2:
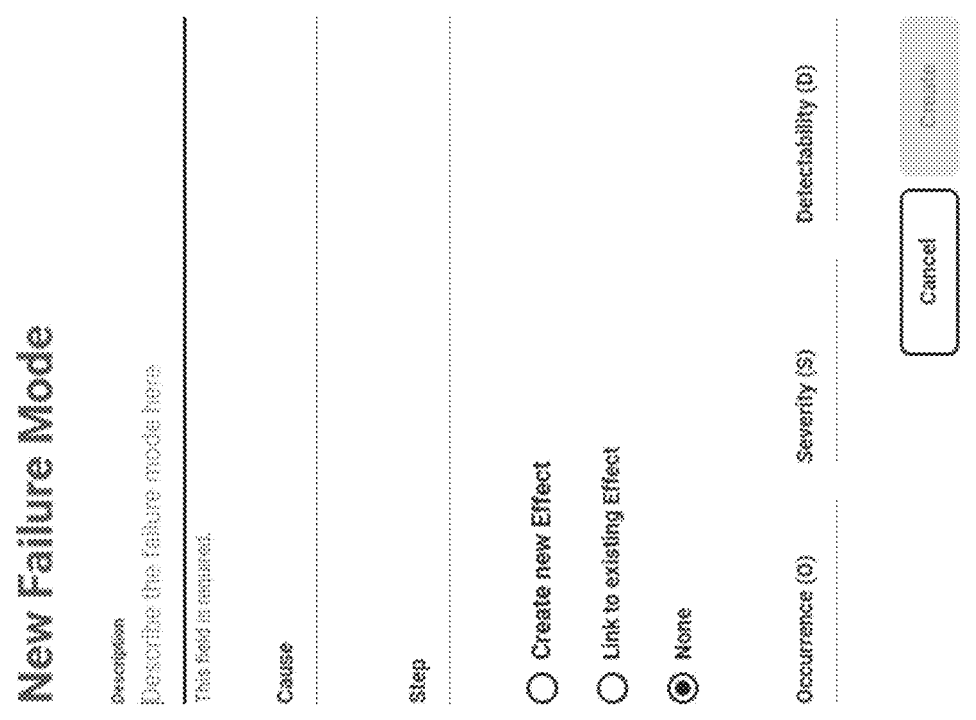

FIG. 2 shows an exemplary graphical user interface depicting one exemplary way of performing the step of obtaining data of the common data set, wherein the user may input data relating to a failure mode, a cause associated to the failure mode, an effect associated to the failure mode and the corresponding process step.

The graphical user interface depicted in FIG. 2 may be used as many times as needed until the entirety of the data of the common data set has been inputted by the user. Although not directly enabled by the graphical user interface depicted in FIG. 2, other data of the common data set including the risk migration measures associated to each failure mode of said set of failure modes may be inputted via any suitable alternative graphical user interface.

The method further comprises the step of selecting a representation of the technical system as a FMEA table or as one or more FTA fault tree(s). This selection step may be performed in any ways commonly known in the art.

In some embodiments, the step of selecting a representation of the technical system as a FMEA table or as one or more FTA fault tree(s) is performed by requesting a user to select a representation of the technical system as an FMEA table or as one or more FTA fault tree(s). In a typical aspect, the selection may suitably be made via the graphical user interface.

According to the method described herein, if a representation as a FMEA table is selected, the FMEA table of the technical system will be generated and displayed on the graphical user interface by using the data of the common data set and by grouping the failure modes in said table according to the process step they correspond to. If alternatively, a representation as one or more FTA fault tree(s) is selected, the one or more FTA fault tree(s) of the technical system will be generated and displayed on the graphical user interface by using the data of the common data set. Those steps are typically performed by the computer according to techniques well known in the art.

As shown in FIG. 1, the FMEA table and the FTA fault tree(s) are generated by using data of the common data set which were inputted by the user. The FMEA table and the FTA fault tree(s) generated by the present method are hence two different representations of the same data, i.e. data of the common data set. The user may therefore conveniently switch from the FMEA table to the FTA fault tree(s) on the graphical user interface or vice versa at any time, and without necessarily requiring the input of any additional data or performing any additional step.

Due in particular to this equivalence between the FMEA and FTA representations of the technical system under study, any data which are suitably added, deleted or modified by the user will automatically be reflected in the two types of representations. As such, the FMEA and FTA representations are continuously and automatically synchronized.

As will be apparent to those skilled in the art, the FMEA table shows risks from a process point of view (i.e. the failure modes are grouped according to the corresponding process step), whereas the FTA fault tree(s) show risks from the point of view of the effects generated by the corresponding failure modes (i.e. the failure modes are grouped according to their corresponding effect).

FIG. 3 shows an exemplary FMEA table generated and displayed as part of the method for an exemplary technical system after the user has inputted corresponding data of the common data set.

In this table, the failure modes (FM(1)-FM(6)) are grouped according to the associated process steps (Step (1)-Step(3)) and sub steps (Substep(2,1), Substep(2,2)). The table also shows the effects (EFFECT1-EFFECT3) associated to each failure mode, the causes (Cause (1,0)-Cause (6,1)) associated to the corresponding failure modes, as well as the risk mitigation measures associated to each failure mode (preventions Prev(1,0,0)-Prev(6,1,1)) and barriers (Barrier (1,0)-Barrier (6,3)).

According to the FMEA table shown in FIG. 3, it can be derived for example that process step Step(1) is associated with two failure modes (FM(1) and FM(2)), wherein cause Cause(1,0) is associated with failure mode FM(1) which produces effect EFFECT1, and wherein failure mode FM(1) is further associated with prevention Prev(1,0,0) and barrier Barrier(1,0). The process step Step(1) is further associated with failure mode FM(2) which produces effect EFFECT2, and wherein failure mode FM(2) is further associated with prevention Prev(2,0,0) and barrier Barrier(2,0).

Figure 4:
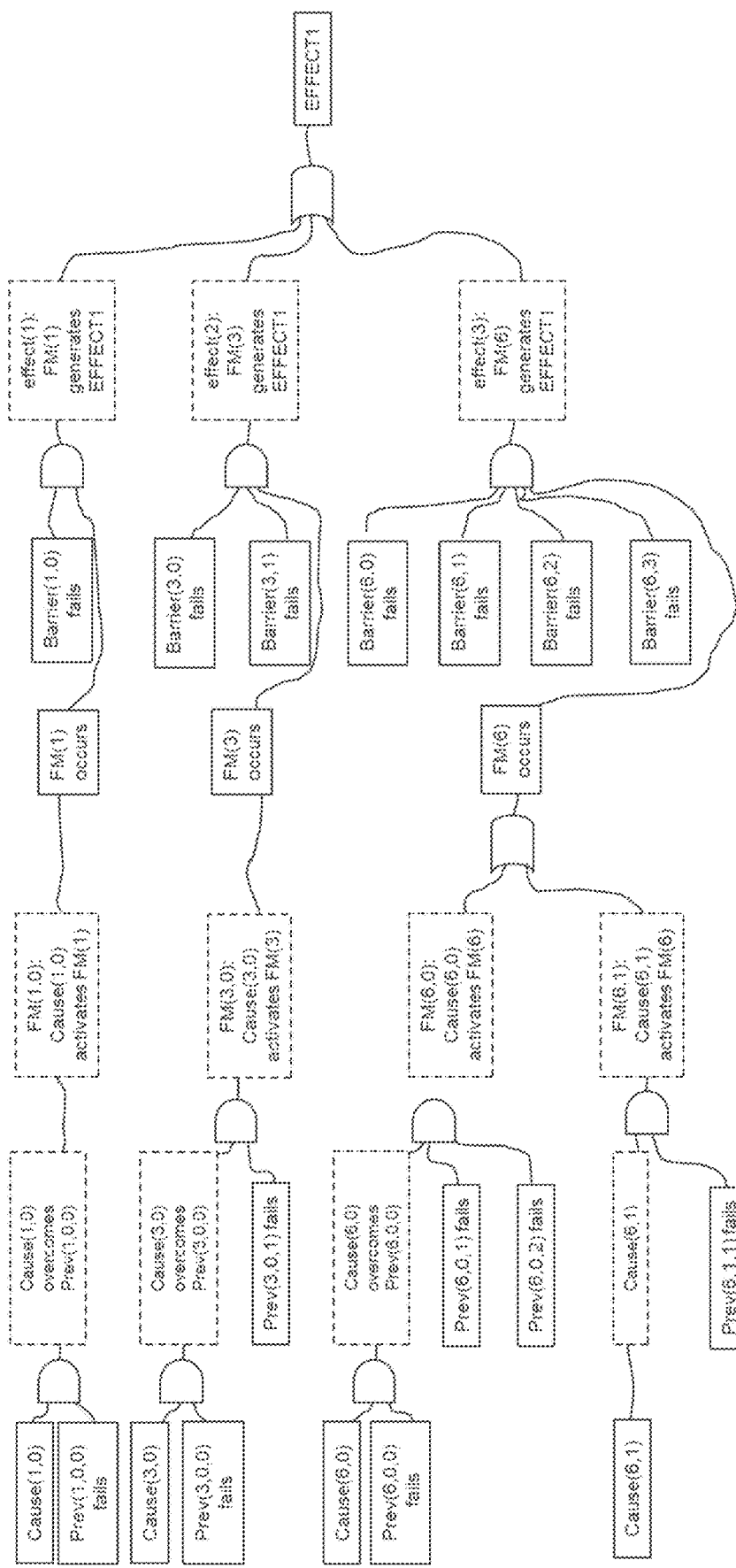
FIG. 4 shows an exemplary FTA fault tree of the exemplary technical system used for generating the FMEA table of FIG. 3.

FIG. 4 shows one exemplary FTA fault tree generated and displayed as part of the present method and corresponding to the data of the common data set which was used for generating the FMEA table of FIG. 3 specifically for the single effect "EFFECT1".

In the FTA fault tree depicted in FIG. 4, the failure modes (FM(1), FM(3) and FM(6)) are grouped according to their associated effect (EFFECT1), and the causes (Cause (3,0), Cause (6,0), and Cause (6,1) associated to the respective failure modes (FM(1), FM(3), and FM(6), as well as the associated risk mitigation measures (preventions Prev(1,0, 0), Prev(3,0,0), Prev(3,0,1) Prev(6,0,0), Prev(6,0,1), Prev(6, 0,2), Prev(6,1,1) and barriers Barrier(1,0), Barrier(3,0), Barrier(3,1), Barrier(6,0), Barrier(6,1), Barrier(6,2), Barrier(6, 3)) are also represented. The associated process steps (Step (1)-Step(3)) as implemented by the technical system when in operation are however not represented in the FTA fault tree in this example.

According to the present method, similar FTA fault tree may be generated and displayed specifically for the single effect "EFFECT2" and for the single effect "EFFECT3". As part of the present method, those additional FTA fault trees may be either automatically generated and displayed on the graphical user interface, or may be individually generated and displayed according to the preferences and selections made by the user.

In an exemplary embodiment of the method, in each FTA fault tree corresponding to a given EFFECT, the failure modes are visualized as branches and casted in the following form:

EFFECT=OR (effect(1), . . . , effect(I));
effect(i)=AND (failure mode(i), barrier(i,0), . . . , barrier (i,J));
failure mode(i)=OR (failure mode(i,1), . . . , failure mode(i,K));
failure mode(i,k)=AND (cause(i,k), prevention(i,k, 1), . . . , prevention(i,k,N)); wherein:
effect(i)=the EFFECT is generated by the ith failure mode, (i=1 . . . I),
failure mode(i)=the ith failure mode associated to the effect(i), (i=1 . . . I) occurs,
barrier(i,j)=the jth barrier fails to detect the occurrence of ith failure mode before it generates the effect(i), (j=0 . . . J),
failure mode(i,k)=the ith failure mode occurs due to the kth cause, (k=0 . . . K),
cause(i,k)=the kth cause associated to the ith failure mode activates it,
prevention(i,k,n)=the nth prevention fails to block cause(i,k) from activating the failure mode(i), (n=0 . . . N).

The "OR" and "AND" functions are to be understood as logical "OR" and "AND" functions (Boolean logic). As shown on FIG. 4, the "OR" function may for example be represented on the graphical user interface by a logical OR gate, and the "AND" function may for example be represented on the graphical user interface by a logical AND gate.

In the example of FIG. 4, the following items of the fault tree corresponding to the EFFECT1 of FIG. 3 are generated and displayed:

EFFECT1=OR(effect(1),effect(2),effect(3))⇒(I=3)
effect(1)=AND(FM1, Barrier(1,0))⇒(J=0)
FM(1)=FM(1,0)⇒(K=0)
FM(1,0)=OR(Cause(1,0),Prev(1,0,0))⇒(N=0)
effect(2)=AND(FM(3), Barrier(3,0), Barrier(3,1))⇒(J=1)
FM(3)=FM(3,0)⇒(K=0)
FM(3,0)=OR(Cause(3,0),Prev(3,0,0);Prev(3,0,1))⇒(N=1)
effect(3)=AND(FM(6),Barrier(6,0), Barrier(6,1), Barrier(6,2), Barrier(6,3))⇒(J=3)
FM(6)=OR(FM(6,0),FM(6,1))⇒(K=1)
FM(6,0)=OR(Cause(6,0),Prev(6,0,0);Prev(6,0,1),Prev(6,0,2))⇒(N=2)
FM(6,1)=OR(Cause(6,1),Prev(6,1,1))⇒(N=1)

In another exemplary embodiment of the method, the failure modes for use herein are considered independent from each other, which means that the onset of a failure mode is considered as unrelated to the onset of the other failures modes.

In still another exemplary embodiment of the method, every failure mode for use herein is considered to have one and only one (main) effect.

In another example of the method, a prevention is classified as an initial prevention or as an added prevention in case it is chronologically posterior to the initial prevention, and/or a barrier is classified as an initial barrier or as an added barrier in case it is chronologically posterior to the initial barrier. This is beneficial as it allows the risk mitigation measures to be updated and integrated into the overall risk analysis as more information about the technical system under study become available, and in particular as a result of an initial risk analysis performed on the initial data of the common data set. This not only leads to a more accurate and more efficient risk analysis, but also allows making proper adaptations and improvements to the technical system under study.

In still another example of the method, the step of obtaining data of the common data set is performed by requesting a user to input the data of the common data set. According to an exemplary aspect, the user manually enters suitable data into the various fields suggested by a computer and visible via a graphical user interface.

The step of obtaining data of the common data set may alternatively be performed by loading or importing the data of the common data set from an external device or a data storage centre for example.

In yet another embodiment, the present method further comprises the step of calculating a risk assessment metric associated to a failure mode.

In a typical embodiment of the present method, the risk assessment metric for use herein is calculated by the associated computer based on additional data introduced in the common data set. Those additional data of the common data set are typically inputted by the user and comprise in particular values such as the occurrence score (O), detectability score (D) or severity (S) of a particular failure mode. Exemplary additional data of the common data set may further comprise the average number of runs of the technical system performed during a specific period of time (T), the fraction of the runs of the technical system in which the process step associated to a specific failure mode are performed (F), the average number of times a process step is performed per run of the technical system (R), the probability Pmiss that a failure mode remains undetected before said failure mode generates its associated effects, and the probability Pres that the preventions fail to prevent the occurrence of a failure mode. All these additional data are defined hereinafter.

In some embodiments of the method, the risk assessment metric for use herein may comprise:
a) a probability that said failure mode is activated by the associated causes; and/or
b) a measure of the strength of the risk mitigation measures associated to said failure mode; and/or
c) a probability that said failure mode generates its associated effects.

In some other embodiments, the risk assessment metric further comprises the frequency at which a top event is expected to occur during a period of time.

Figure 5:
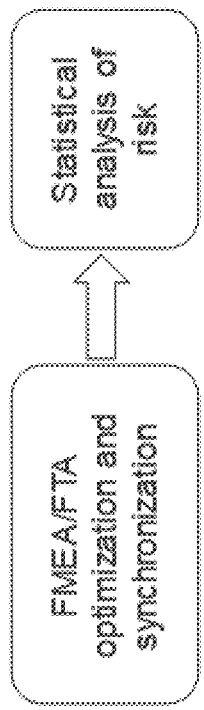
FIG. 5 shows a flow diagram depicting another exemplary embodiment of the method according to the present disclosure.

The step of calculating a proper risk assessment as detailed above, allows the user to perform a statistical analysis of the risks associated with the technical system under study. FIG. 5 shows a flow diagram depicting an exemplary embodiment wherein is schematically represented the statistical risk analysis further enabled by the method according to the present disclosure.

In an exemplary embodiment, the risk assessment metric for use herein includes occurrence (O) and/or detectability (D) and/or severity (S) of said failure mode. In that context, the risk priority number (RPN) corresponding to RPN=S.O.D, may be used and included as well in the risk assessment metric.

According to still another embodiment, the method further comprises the step of calculating a probability $p_{eff}$ that a failure mode generates an associated effect, wherein the probability $p_{eff}$ is calculated as follows:

$$p_{eff} = P_{occ} * P_{miss},$$

$$P_{miss} = p_{miss}1 \cdot \ldots \cdot p_{miss}J,$$

$$P_{occ} = p_{occ}1 \cap \ldots \cap p_{occ}K,$$

$$p_{occ}k = p_{occ,t}k \cdot p_{res}1 \cdot \ldots \cdot p_{res}N(k),$$

wherein:
$P_{occ}$ is the probability that the failure mode occurs,
$P_{miss}$ is the conditional probability that the failure mode remains undetected, given that the failure mode occurs,
$p_{miss}j$, is the probability that the jth barrier fails to detect the failure mode before it generates its effect, (j=1 ... J),
$p_{occ}k$ is the probability that the failure mode is activated by the $k^{th}$ cause, (k=1 ... K),
$p_{occ,t}k$ is the probability that the $k^{th}$ cause activates the failure mode if no associated added preventions are present,
$p_{res}n$ is the probability that the nth added prevention acting on the $k^{th}$ cause fails to prevent the occurrence of the failure mode, (n=1 ... N(k)).

This particular execution of the method allows achieving a more accurate determination of the probability that a failure mode generates an associated effect.

According to an advantageous embodiment, the method further comprises the steps of:
a) associating $P_{occ}$ to the FMEA occurrence index O, through a function $P_{occ}(O)$;
b) associating $P_{miss}$ to the FMEA detectability index D, through a function $P_{miss}(D)$;
wherein $P_{occ}(O)$ and $P_{miss}(D)$ are invertible functions.

The statistical risk analysis or evaluation permitted by the present method also enables making decisions about the implementation of suitable risk mitigation measures and the determination of suitable risk mitigation scenarios that could advantageously be deployed in the technical system under study. This determination is in particular possible through a cost/benefit analysis of the specific risk mitigation measures under consideration, and which are also enabled by a method according to the present disclosure.

Figure 6:
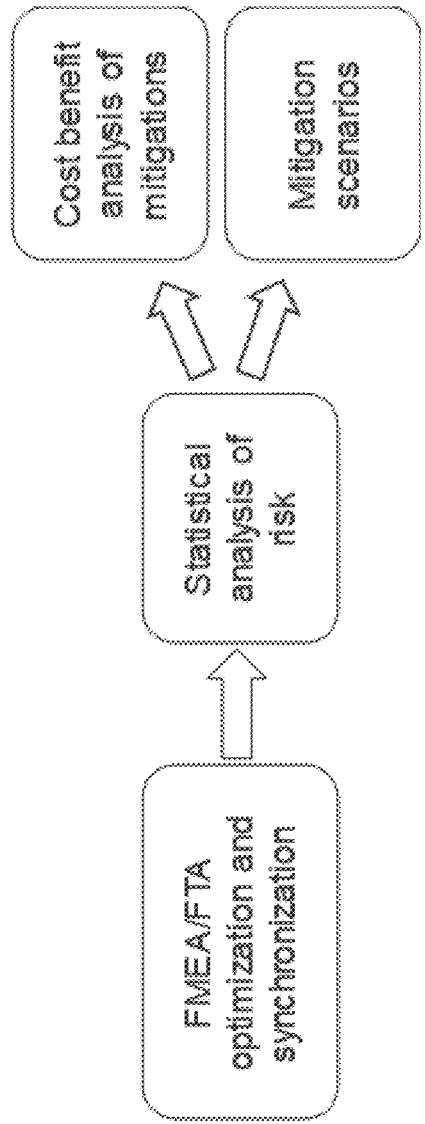
FIG. 6 shows a flow diagram depicting still another exemplary embodiment of the method according to the present disclosure.

FIG. 6 shows a flow diagram depicting an exemplary embodiment wherein are schematically represented the cost/benefit analysis of the specific risk mitigation measures and the determination of suitable risk mitigation scenarios further enabled by the method.

According to a more advantageous embodiment, the method further comprises the step of calculating a frequency Neff at which a top event is expected to occur during a period of time, and wherein the frequency Neff is calculated as follows:

$$N_{\mathit{eff}} = n_{\mathit{eff}}1 + \ldots + n_{\mathit{eff}}W$$

$$n_{\mathit{eff}}w = p_{\mathit{eff}}w * T * F * R$$

wherein:

$n_{\mathit{eff}}w$ is the frequency at which said top event is expected to occur during said period of time due to the $w^{th}$ failure mode, (w=1 ... W), $p_{\mathit{eff}}w$ is the probability that an effect is produced due to the $w^{th}$ failure mode, T is an average number of runs of the technical system during said period of time, F is the fraction of the runs of the technical system in which the process step associated to the $w^{th}$ failure mode is performed, and R is the average number of times said process step is performed per run of the technical system.

This particular execution of the method allows achieving a more accurate determination of the frequency at which the top event (i.e. one effect of said set of effects) is expected to occur during a certain period of time.

In the context of the present disclosure, the expression "run of the technical system" is meant to designate the execution of the process implemented by the technical system, wherein the process includes a series of successive process steps and sub steps executed according to a defined sequence.

Figure 7:
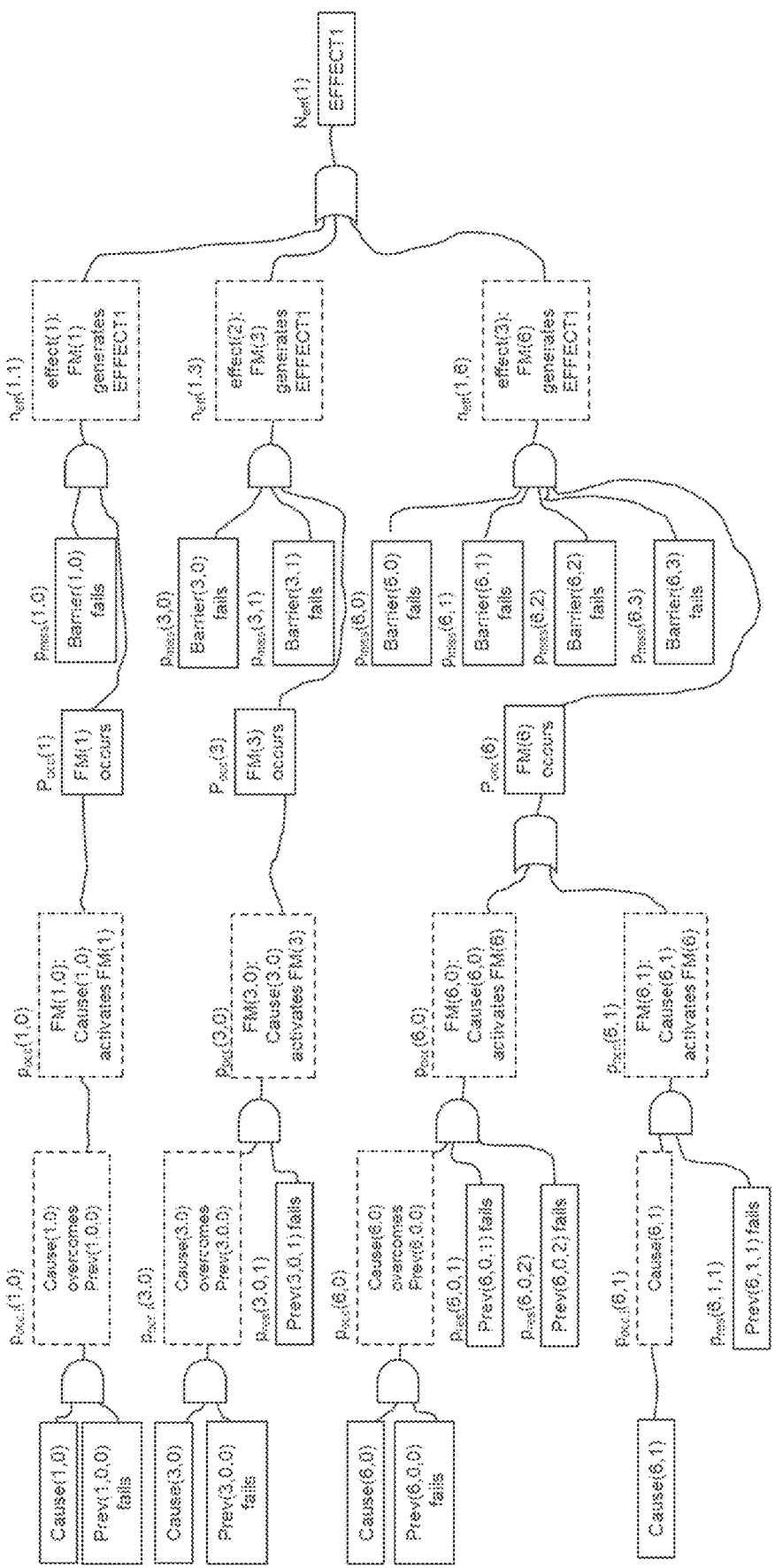
FIG. 7 shows another exemplary FTA fault tree of the exemplary technical system used for generating the FTA fault tree of FIG. 4.

FIG. 7 shows another exemplary FTA fault tree of the exemplary technical system used for generating the FTA fault tree of FIG. 4, wherein the relationship between various calculated statistical parameters such as probability and frequency factors (as detailed hereinbefore) and fault-related events is represented.

Figure 9:
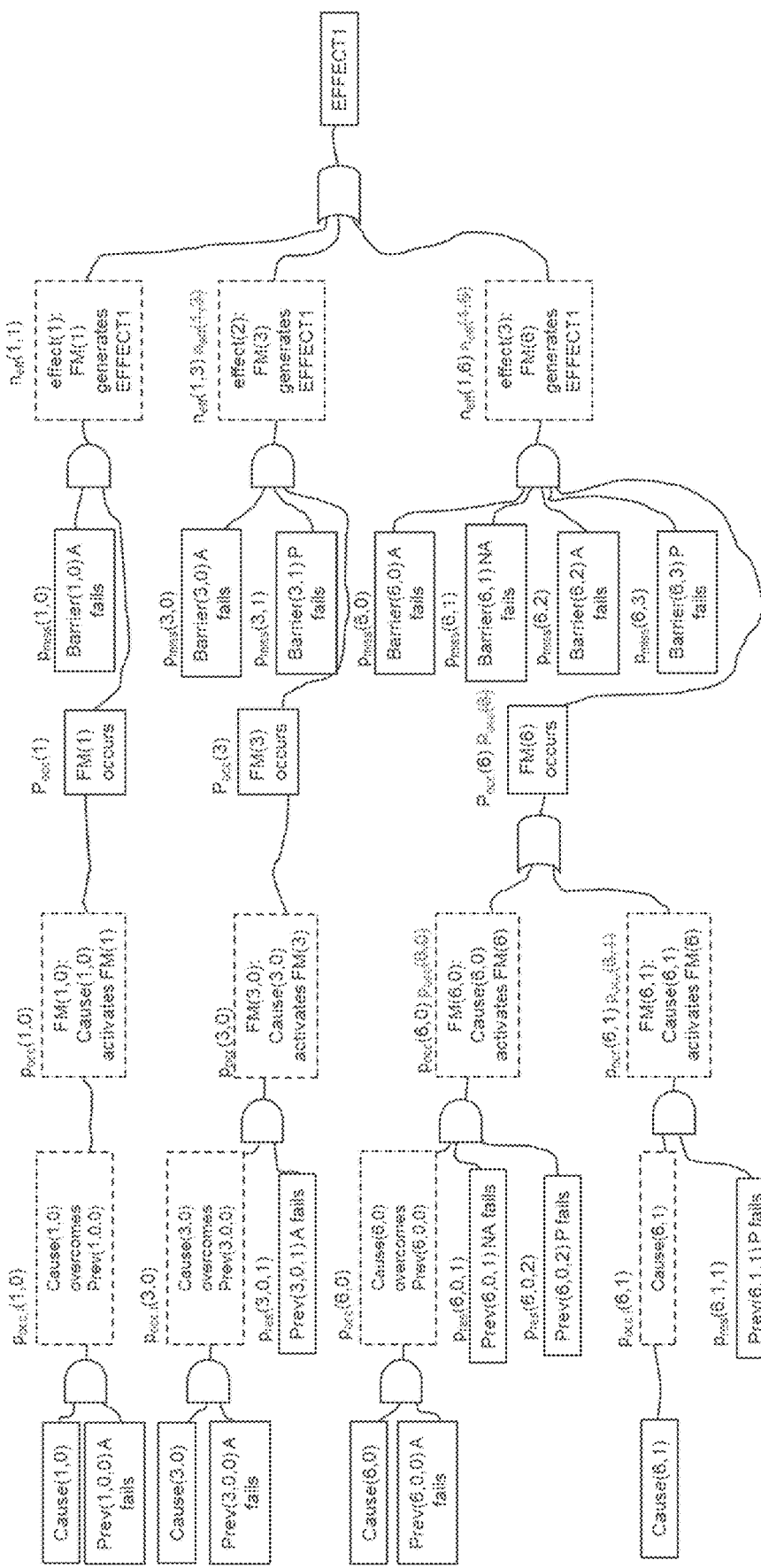
FIG. 9 shows still another exemplary FTA fault tree of the exemplary technical system used for generating FTA fault tree of FIG. 7.

FIG. 8 shows another exemplary FMEA table of the exemplary technical system used for generating the FMEA table of FIG. 3, and wherein the results of various risk mitigation scenarios are represented. The same results of these various risk mitigation scenarios are similarly represented in FIG. 9 using this time a FTA fault tree representation.

More specifically, the different statuses of the various risk mitigation measures (prevention or barrier) are represented as:

Active (A): currently implemented and active in the system;

Potential (P): an idea currently being tested or evaluated;

Not active (NA): implemented or evaluated in the past, but not implemented anymore (for example by lack of interest).

The values of statistical parameters (frequency or probability) displayed in the FMEA table and the FTA fault trees depend on which risk mitigation measures are taken into account. Thus, one can display more values for the same parameter, which corresponds to different risk mitigation scenarios. This is specifically shown in FIG. 8 and FIG. 9 according to respectively a FMEA table and a FTA fault tree representation, wherein it can be noted that:

failure modes FM(1), FM(2) and FM(5) do not have potential mitigations. Thus, only one value is displayed for 0, D, RPN, $n_{\mathit{eff}}$ in the FMEA table. Similarly, only one value is displayed for $P_{occ}$, $n_{\mathit{eff}}$ and $N_{\mathit{eff}}$ in the FTA fault tree;

failure mode FM(3) has one potential barrier. Therefore, two values are displayed for D, RPN, $n_{\mathit{eff}}$, $N_{\mathit{eff}}$. These values are decreased by the potential barrier since it decreases the overall probability that the failure goes undetected. O and $P_{occ}$ are not influenced;

failure mode FM(4) has one potential prevention. It decreases the overall occurrence probability; thus, two values are indicated for O, RPN and $n_{\mathit{eff}}$ in FMEA table. The tree of Effect(3) is not shown in FIG. 9, otherwise one would see two values for $P_{occ}$ as well;

failure mode FM(6) has both a potential barrier (improving detectability) and two potential preventions (reducing occurrence); thus, two double values for O, $P_{occ}$, D, $n_{\mathit{eff}}$, $N_{\mathit{eff}}$ are displayed in the FNMA table and in the corresponding FTA fault tree.

In another advantageous embodiment of the method, a failure mode whose risk assessment metric value is lower than a threshold value is removed from the FTA fault tree(s) of the technical system. This particular execution of the method beneficially impacts the overall efficiency of the associated risk analysis by focusing on those failure modes which impact the most the technical system under study.

In still another advantageous embodiment, the method further comprises the step of evaluating the benefit provided by a given risk mitigation measure associated to a failure mode in terms of the impact that said given risk mitigation measure has on the risk assessment metrics value associated to said failure mode. This particular execution of the method beneficially impacts the overall efficiency of the associated risk analysis by focusing on those risk mitigation measures which impact the most the technical system under study.

In yet another advantageous embodiment, the method further comprises the step of comparing the benefit provided by the given risk mitigation measure with the cost of implementing the given risk mitigation measure. This particular execution of the method enables formulating appropriate risk mitigation scenarios and performing suitable cost benefit analysis of the corresponding risk mitigation measures.

In an exemplary embodiment of the method, the cost of implementing a given risk mitigation measure for use herein is calculated by the associated computer based on additional cost-related data introduced in the common data set. Those additional cost-related data of the common data set are typically inputted by the user and comprise in particular values such as the acquisition, implementation, maintenance and operating costs of a given risk mitigation measure.

Acquisition, implementation, maintenance and operating costs of a mitigation can be specified when a risk mitigation measure is created, or with a later editing. These non-recurrent and recurrent costs can be easily summarized with a single parameter, e.g. overall cost over 5 years (5y) of operation. Thanks to the statistical parameters described hereinbefore, the benefit can be evaluated as the difference in the average number of runs of the technical system which would be affected by the failure mode with and without the new mitigation in place.

For instance, for a new potential mitigation X, the benefit can be calculated according to the following formula:

Benefit=$N_{eff}$(with active mitigations)−$N_{eff}$(with active mitigations and X)

If the cost/benefit analysis of different risk mitigation measures is presented in a table, the measures worth implementing with the available budget can be easily determined.

FIG. 10 shows an exemplary cost benefit analysis table of exemplary risk mitigation measures for use in one exemplary embodiment of the method.

According to the method, the fact that the same mitigation (prevention or barrier) is effective against more failure modes, or that a prevention is effective against more causes of the same failure mode may also be taken into account in the cost/benefit analysis. For example, if the same barrier has been associated independently to two failure modes (with two independent $P_{miss}$ values). This barrier generates two entries in the cost/benefit table. These two entries can be merged, so that the acquisition cost is counted just once, and the benefits are added up. In this way, risk mitigation measures which are effective against more failure modes are evaluated in more favorable and realistic way.

This alternative embodiment is represented in FIG. 11 which shows the results of the cost benefit analysis table of FIG. 10, but wherein some entries have been suitably merged.

According to an exemplary embodiment of the method, the technical system for use herein is a healthcare technical system, in particular a radiotherapy technical system or a particle therapy technical system.

The present disclosure also provides an apparatus for generating one or more FTA fault trees from an FMEA table of a technical system or vice versa, the apparatus comprising one or more modules configured to perform the method as described above.

The apparatus may for example comprise a receiving module, a generating module and a graphical user interface, which are communicatively connected by a bus.

As will be easily apparent to those skilled in the art, the apparatus may comprise further components or modules, including but not limited to, a processor, a memory unit, an input device such as a keyboard or computer mouse, and a display device.

The receiving module is configured to receive the data of the common data set and effect analysis of the technical system. The receiving module may be implemented by means of the processor, the memory unit and a computer program component which can for example execute executable instructions by means of the processor.

The generating module is configured to generate the FMEA table and/or the one or more FTA fault tree(s) by using the data of the common data set. The generating module may be typically implemented by means of the processor, the memory unit and the program component.

The present disclosure further provides a computer program product storing executable instructions, which when executed by a computer, cause the computer to perform the method as described above.

Figure 12:
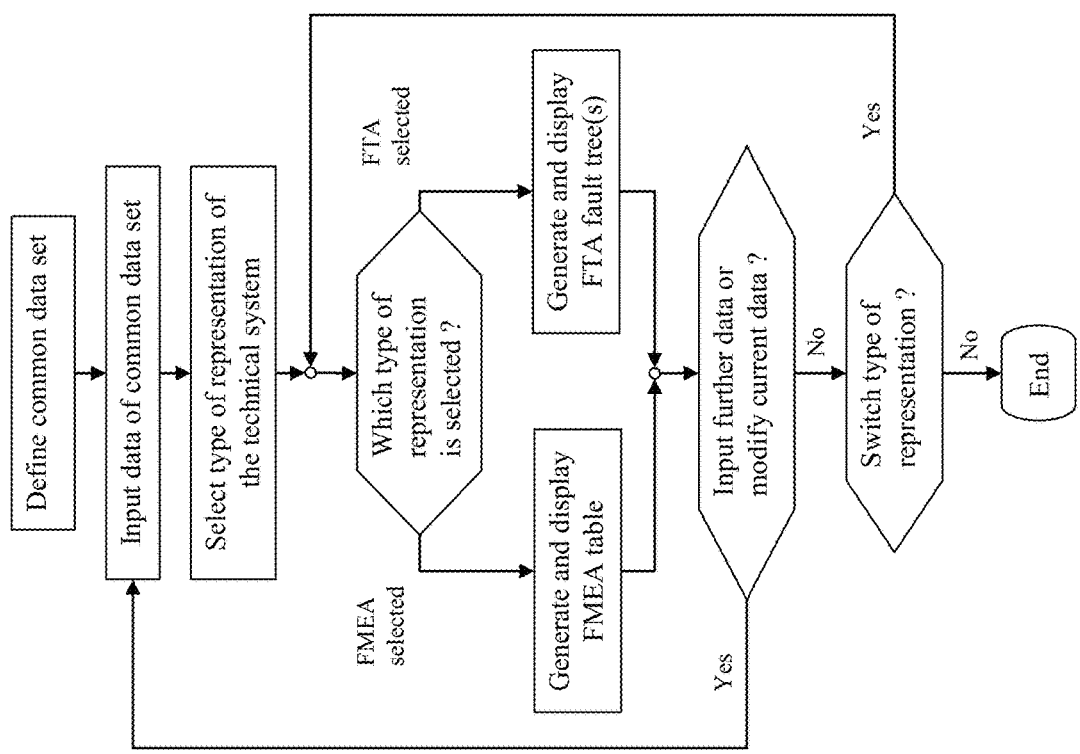
FIG. 12 shows a flow diagram depicting an exemplary embodiment of the computer program according to the present disclosure.

FIG. 12 shows a flow diagram depicting an exemplary embodiment of the computer program according to the present disclosure. In this figure are schematically represented the various sequential steps as executed by the computer program: i) defining the common data set; ii) inputting the common data set; iii) selecting the representation of the technical system; iv) either generating and displaying a FMEA table or one or more FTA fault tree(s) depending on the selection of the user; v) asking whether further data shall be inputted in the common data set, if yes, the data will be inputted at the right step, if no; vi) asking whether the user want to switch the representation of the technical system, if yes, the switch will be inputted at the right step, if no; vii) the program is ended.

The present disclosure has been described in terms of specific embodiments, which are illustrative and not to be construed as limiting. More generally, it will be appreciated by persons skilled in the art that the present disclosure is not limited by what has been particularly shown and/or described hereinabove.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

What is claimed is:

1. A computer-based method for generating one or more fault tree analysis (FTA) fault trees from a failure modes and effects analysis (FMEA) table of a technical system, or generating the FMEA table from the one or more FTA fault trees of the technical system, the computer-based method comprising:

obtaining, by a computer from a memory, a common data set for both the FMEA table and the one or more FTA fault trees of the technical system, wherein the common data set comprises:
at least one set of failure modes,
a set of causes associated with the at least one set of failure modes,
a set of effects associated with the at least one set of failure modes,
a set of risk mitigation measures associated with the at least one set of failure modes, and
a set of process steps to be performed by the technical system when in operation, wherein one of the process steps is associated with one of the at least one set of failure modes;

classifying one of the risk mitigation measures as a prevention in the common data set if the one of the risk mitigation measures is able to block a cause before the cause activates an associated failure mode, or as a barrier in the common data set if the one of the risk mitigation measures is able to detect a failure mode before the failure mode generates an associated effect;

selecting a representation of the technical system as the FMEA table or as the one or more FTA fault trees;

if the representation of the technical system is selected as the FMEA table:
automatically generating, by the computer, the FMEA table by using the common data set and grouping failure modes of the FMEA table according to one or more of the process steps of the technical system when in operation, the one or more of the process steps associated with the grouped failure modes; and
displaying the FMEA table on a graphical user interface; and if the representation of the technical system is selected as the one or more FTA fault trees:
  automatically generating, by the computer, the one or more FTA fault trees by using the causes, failure modes, effects, preventions, and barriers of the common data set; and
  displaying the one or more FTA fault trees on the graphical user interface,
  wherein each of the one or more FTA fault trees has one of the effects as a top event and is configured to represent relationships between the causes, the failure modes, the effects, the preventions, and the barriers, the relationships including:
    one of the effects is produced if an associated one of the failure modes generates the one of the effects;
    one of the failure modes generates one or more associated effects if the one of the failure modes occurs, and all the barriers associated with the one of the failure modes fail to detect the one of the failure modes; and
    one of the failure modes occurs if one of associated causes activates the one of the failure modes, and associated preventions fail to prevent the one of the associated causes from activating the one of the failure modes.

2. The computer-based method of claim 1, wherein in each of the one or more of the FTA fault trees corresponding to a Boolean logic result, represented by an EFFECT symbol, displaying the one or more of the FTA fault trees on the graphical user interface comprises:
  displaying the failure modes as branches and in a form on the graphical user interface, the form comprising:
  EFFECT=OR (effect (1), . . . , effect (I);
  effect (i)=AND (failure mode (i), barrier (i, 0), . . . , barrier (i, J));
  failure mode (i)=OR (failure mode (i, 1), . . . failure mode (i, K)); and
  failure mode (i, k)=AND (cause (i, k), prevention (i, k, 1), . . . prevention (i, k, N));
  wherein:
    effect (i)=the EFFECT is generated by an ith failure mode, i=1, . . . , I;
    failure mode (i)=the ith failure mode associated with effect (i), i=1, . . . I;
    barrier (i, j)=a jth barrier fails to detect an occurrence of the ith failure mode before the ith failure mode generates effect (i), j=0, . . . , J;
    failure mode (i, k)=the ith failure mode occurs due to a kth cause, k=0, . . . , K;
    cause (i, k)=the kth cause associated with the ith failure mode; and
    prevention (i, k, n)=an nth prevention fails to block cause (i, k) from activating the failure mode (i), n=0, . . . , N.

3. The computer-based method of claim 1, further comprising:
  classifying one of the preventions as an initial prevention, or as an added prevention in case the one of the preventions is chronologically posterior to the initial prevention; or
  classifying one of the barriers as an initial barrier, or as an added barrier in case the one of the barriers is chronologically posterior to the initial barrier; or
  classifying the one of the preventions as the initial prevention, or the added prevention in case the one of the preventions is chronologically posterior to the initial prevention, and classifying the one of the barriers as the initial barrier, or as the added barrier in case the one of the barriers is chronologically posterior to the initial barrier.

4. The computer-based method of claim 1, wherein the obtaining of the common data set comprises:
  requesting an input of the common data set.

5. The computer-based method of claim 1, wherein the selecting of the representation of the technical system as the FMEA table or as the one or more FTA fault trees comprises:
  requesting an input of a selection of the representation of the technical system as the FMEA table or as the one or more FTA fault trees.

6. The computer-based method of claim 1, further comprising:
  calculating a risk assessment metric associated with one of the failure modes, wherein the risk assessment metric comprises at least one of:
    a probability that the one of the failure modes is activated by one or more causes associated therewith,
    a measure of strength of one of the risk mitigation measures associated with the one of the failure modes, or
    a probability that the one of the failure modes generates one or more of the effects associated therewith.

7. The computer-based method of claim 6, wherein the risk assessment metric includes at least one of occurrence, detectability, or severity of the one of the failure modes.

8. The computer-based method of claim 6, wherein a value of the risk assessment metric of the one of the failure modes is lower than a threshold value, the computer-based method further comprising:
  removing the one of the failure modes from the FTA fault trees of the technical system.

9. The computer-based method of claim 6, further comprising:
  determining a benefit of the one of the risk mitigation measures associated with the one of the failure modes in terms of an impact that the one of the risk mitigation measures has on the risk assessment metric.

10. The computer-based method of claim 9, further comprising:
  comparing the benefit of the one of the risk mitigation measures with a cost of the one of the risk mitigation measures.

11. The computer-based method of claim 1, further comprising:
  determining a probability of the one of the failure modes generating an associated effect based on a probability that the one of the failure modes occurs, and a conditional probability that the one of the failure modes remains undetected when the one of the failure modes occurs.

12. The computer-based method of claim 11, further comprising:
  associating the probability that the one of the failure modes occurs with an FMEA occurrence index; and
  associating the conditional probability that the one of the failure modes remains undetected when the one of the failure modes occurs with an FMEA detectability index.

13. The computer-based method of claim 11, further comprising:
  determining a frequency at which the top event is expected to occur during a period of time based on a probability that one of the effects is generated due to one of the failure modes and an average number of runs of the technical system during the period of time.

14. An apparatus for generating one or more fault tree analysis (FTA) fault trees from a failure modes and effects analysis (FMEA) table of a technical system, or generating the FMEA table from the one or more FTA fault trees of the technical system, the apparatus comprising:
a memory configured to store instructions and a common data set for both the FMEA table and the one or more FTA fault trees of the technical system; and
one or more processors configured to execute the instructions to:
obtain, by the one or more processors from the memory, the common data set for both the FMEA table and the one or more FTA fault trees of the technical system, wherein the common data set comprises:
at least one set of failure modes,
a set of causes associated with the at least one set of failure modes,
a set of effects associated with the at least one set of failure modes,
a set of risk mitigation measures associated with the at least one set of failure modes, and
a set of process steps to be performed by the technical system when in operation, wherein one of the process steps is associated with one of the at least one set of failure modes;
classify one of the risk mitigation measures as a prevention in the common data set if the one of the risk mitigation measures is able to block a cause before the cause activates an associated failure mode, or as a barrier in the common data set if the one of the risk mitigation measures is able to detect a failure mode before the failure mode generates an associated effect;
select a representation of the technical system as the FMEA table or as the one or more FTA fault trees;
if the representation of the technical system is selected as the FMEA table:
automatically generate, by the one or more processors, the FMEA table by using the common data set and grouping failure modes of the FMEA table according to one or more of the process steps of the technical system when in operation, the one or more of the process steps associated with the grouped failure modes; and
display the FMEA table on a graphical user interface; and
if the representation of the technical system is selected as the one or more FTA fault trees:
automatically generate, by the one or more processors, the one or more FTA fault trees by using the causes, failure modes, effects, preventions, and barriers of the common data set; and
display the one or more FTA fault trees on the graphical user interface,
wherein each of the one or more FTA fault trees has one of the effects as a top event and is configured to represent relationships between the causes, the failure modes, the effects, the preventions, and the barriers, the relationships including:
one of the effects is produced if an associated one of the failure modes generates the one of the effects;
one of the failure modes generates one or more associated effects if the one of the failure modes occurs, and barriers associated with the one of the failure modes fail to detect the one of the failure modes; and one of the failure modes occurs if one of associated causes activates the one of the failure modes, and associated preventions fail to prevent the one of the associated causes from activating the one of the failure modes.

15. A non-transitory computer-readable medium storing instructions which, when executed, cause one or more processors to perform operations for generating one or more fault tree analysis (FTA) fault trees from a failure modes and effects analysis (FMEA) table of a technical system, or generating the FMEA table from the one or more FTA fault trees of the technical system, the operations comprising:
obtaining, by the one or more processors from a memory, a common data set for both the FMEA table and the one or more FTA fault trees of the technical system, wherein the common data set comprises:
at least one set of failure modes,
a set of causes associated with the at least one set of failure modes,
a set of effects associated with the at least one set of failure modes,
a set of risk mitigation measures associated with the at least one set of failure modes, and
a set of process steps to be performed by the technical system when in operation, wherein one of the process steps is associated with one of the at least one set of failure modes;
classifying one of the risk mitigation measures as a prevention in the common data set if the one of the risk mitigation measures is able to block a cause before the cause activates an associated failure mode, or as a barrier in the common data set if the one of the risk mitigation measures is able to detect a failure mode before the failure mode generates an associated effect;
selecting a representation of the technical system as the FMEA table or as the one or more FTA fault trees;
if the representation of the technical system is selected as the FMEA table:
automatically generating, by the one or more processors, the FMEA table by using the common data set and grouping failure modes of the FMEA table according to one or more of the process steps of the technical system when in operation, the one or more of the process steps associated with the grouped failure modes; and
displaying the FMEA table on a graphical user interface; and
if the representation of the technical system is selected as the one or more FTA fault trees:
automatically generating, by the one or more processors, the one or more FTA fault trees by using the causes, failure modes, effects, preventions, and barriers of the common data set; and
displaying the one or more FTA fault trees on the graphical user interface,
wherein each of the one or more FTA fault trees has one of the effects as a top event and is configured to represent relationships between the causes, the failure modes, the effects, the preventions, and the barriers, the relationships including:
one of the effects is produced if an associated one of the failure modes generates the one of the effects;
one of the failure modes generates one or more associated effects if the one of the failure modes occurs, and barriers associated with the one of the failure modes fail to detect the one of the failure modes; and one of the failure modes occurs if one of associated causes activates the one of the failure modes, and associated preventions fail to prevent the one of the associated causes from activating the one of the failure modes.

* * * * *